United States Patent [19]

Lange

[11] Patent Number: 5,584,156
[45] Date of Patent: Dec. 17, 1996

[54] MODULAR STRUCTURAL FRAMING SYSTEM

[76] Inventor: Fredric Lange, 13690 Elm Creek Rd., Osseo, Minn. 55369-9343

[21] Appl. No.: 159,513

[22] Filed: Nov. 30, 1993

Related U.S. Application Data

[63] Continuation-in-part of Ser. No. 92,602, filed as PCT/US91/09249, Dec. 11, 1991.

[51] Int. Cl.$^6$ .................................................. E04H 12/00
[52] U.S. Cl. ..................... 52/653.1; 52/650.1; 52/658; 52/796.1; 24/20 R; 24/270
[58] Field of Search ............................... 52/650.1, 656.8, 52/659, 663, 690, 692, 653.1, 651.01, 651.07, 656.1, 658, 796.1; 24/295, 455, 20 R, 270; 285/189, 420

[56] References Cited

U.S. PATENT DOCUMENTS

| | | | |
|---|---|---|---|
| 577,598 | 2/1897 | Fordyce | 52/659 |
| 921,196 | 5/1909 | Yuzuk | 439/646 |
| 2,238,355 | 4/1941 | Whitenack | 52/656.8 |
| 2,485,644 | 10/1949 | Norquist | 52/272 |
| 2,625,769 | 1/1953 | Hubbard . | |
| 2,709,094 | 5/1955 | Polanski . | |
| 2,787,035 | 4/1957 | Konefes | 24/295 |
| 3,088,178 | 5/1963 | Propst | 52/586.1 |
| 3,247,637 | 4/1966 | Robertson . | |
| 3,399,916 | 9/1968 | Ensor | 52/588.1 |
| 3,414,152 | 12/1968 | Overton, III . | |
| 3,417,533 | 12/1968 | Sparling . | |
| 3,469,339 | 9/1969 | Thomas . | |
| 3,552,055 | 1/1971 | Matsubayashi et al. . | |
| 3,681,870 | 8/1972 | Alpert . | |
| 3,970,346 | 7/1976 | Krestchmer | 24/295 |
| 4,044,497 | 8/1977 | Bettens . | |
| 4,512,117 | 4/1985 | Lange . | |
| 4,573,754 | 3/1986 | Hill | 439/638 |
| 4,637,193 | 1/1987 | Lange . | |

(List continued on next page.)

FOREIGN PATENT DOCUMENTS

| | | | |
|---|---|---|---|
| 213245 | 2/1958 | Australia | 52/690 |
| 0031863 | 7/1981 | European Pat. Off. . | |
| 0279987 | 8/1988 | European Pat. Off. . | |
| 567452 | 3/1924 | France | 52/659 |
| 2218706 | 10/1973 | Germany . | |
| 8805221 | 9/1988 | Germany . | |
| 8907034 | 8/1989 | WIPO . | |

*Primary Examiner*—Michael Safavi
*Attorney, Agent, or Firm*—Peterson, Wicks, Nemer & Kamrath, P.A.

[57] ABSTRACT

A framing system (10) is disclosed including three-dimensional structural members (12, 14) formed from planar panels (16) having their edges removably secured together by provisions (48) including slide connectors (66, 174) which receive lugs (52) slideably received in and abutting with latches (56). The panels (16) include interconnect ports (22) having integral, concentric tubes (24). The exterior faces (18) of the structural members (12, 14) are abutted together, with the structural members (12, 14) being clamped by a clamp (28) having a central wall (30) abutting with the tubes (24) and first and second side walls (32, 34) abutting with the free faces (25) of the tubes (24). Relative rotation is prevented between the clamp (28) and the structural members (12, 14) by detents (44) formed in the clamp (28) which are received in notches (26) formed in the free face (25) of the tubes (24). A hanging accessory (114) includes an end plate (116) having a U-shaped channel (120) formed therein and a cable (122) secured thereto. By sliding the U-shaped channel (120) over the thickness of the tube (24), the hanging accessory (114) is able to pass through the port (22) and be oriented to abut with the tube (24). Provisions (84) are also provided for attaching accessories including a sleeve (86) having a removable cover (88). The sleeve (86) includes a cylindrical portion (96) slideably received in the ports (22) and having detents (102) slideable through the notches (26) of the tubes (24) and abuttable with the tubes (24) intermediate the notches (26).

18 Claims, 5 Drawing Sheets

U.S. PATENT DOCUMENTS

| | | |
|---|---|---|
| 4,775,258 | 10/1988 | Lange . |
| 4,776,719 | 10/1988 | Kreider . |
| 4,776,721 | 10/1988 | Lange . |
| 4,787,768 | 11/1988 | Lange . |
| 4,923,245 | 5/1990 | Kuwabara .................................. 24/295 |
| 4,969,923 | 11/1990 | Reeder et al. ........................... 285/420 |
| 4,978,244 | 12/1990 | Lange . |
| 4,982,546 | 1/1991 | Lange . |
| 5,150,927 | 9/1992 | Skinner .................................... 285/189 |

MODULAR STRUCTURAL FRAMING SYSTEM

CROSS REFERENCE

The present application is a continuation-in-part of application Ser. No. 08/092,602 filed Jul. 16, 1993 which is a continuation-in-part of International Appln. No. PCT/US 91/09249 filed Dec. 11, 1991.

BACKGROUND

The present invention generally relates to modular structural framing systems, and particularly to attachment panels, clamps, and interconnect apparatus therefor.

The craft of building structures is well known. Typical wood framing utilizing 2 inch by 4 inch (5 cm by 10 cm) studs has been used for construction for many years, with metal studs being used more recently. Further, steel, aluminum, wood, plastic, and other materials have been used for fabricating tubing, channel, "T" or "I" beams, and like structural members. Typically, studs and other structural members are joined together with nails, barbed plates, bolts, rivets, and the like. Other structures utilized columns and beams connected by other methods of fastening including rope lashing, special notch cutting, mitering and nesting techniques, and the like to obtain strong and simple connections to build a variety of structures. As time progressed, building materials such as stone, wood, steel, and more recently composites have become standardized in size, weight, and strength. The introduction of truss or space frames allowed building materials to have reduced structural mass and increased span resulting in higher strength to weight ratios. However, most construction practice used in fastening building structural components of a structure together still rely upon common devices such as nails, rivets, bolts, and like fasteners. Also, building materials are generally of a solid mass or unitized truss member requiring the maximum space for storage or transport. Further, quick connect/disconnect fastening mechanisms for structural members so that they can be rapidly assembled and disassembled without compromising structural strength are known such as shown in U.S. Pat. No. 4,776,721. However, such fastening mechanisms utilized clamping mechanisms extending around the periphery of portions of the structural members thus restricting the configuration thereof and/or location of the attachment of one structural member to another, i.e. an in-line end tube connection will not attach to the side wall of another tube, etc., and often would not allow communication through the fastening mechanism. Also, prior quick connect/disconnect fastening mechanisms may only join together respective male/female structural members by a change in orientation and by radial translation and/or displacement of one or more members to interfit the male/female interface.

Thus, a need exists for modular structural framing systems including components which overcome the disadvantages of prior fastening mechanisms.

SUMMARY

The present invention solves these needs and other problems in the field of framing systems by providing, in the preferred form, an interconnect apparatus including a clamp which is removably locatable in ports of abutting first and second structural members for abutting with the ports and the opposite faces of the first and second structural members and clamping the first and second structural members together.

In a preferred form of the present invention, the clamp includes at least a first outwardly directed ear extending from the central wall intermediate the side walls and having a radial extent greater than the side walls for abutting with the faces of the structural members, with the ear allowing ease of assembly of the clamp and the first and second structural members.

In other preferred aspects of the present invention, the structural members are formed from attachment panels secured together by their edges. In a preferred form, the interconnect port includes a tube integrally extending from the plate beyond the interior face to allow minimizing the thickness of the plate.

Also in a preferred form, the edges of the attachment panels are removably secured together by the receipt of free edges of a plurality of spaced lugs extending from the edges of the panels in the latching edges of a plurality of complementary spaced latches.

In other aspects of the present invention, the free edge of a flange of a stiffener abuts with and transfers forces to the side panel of a first three-dimensional, hollow structural member, with the stiffener being held with the end panel of the first structural member interconnected to a second structural member by a clamp.

It is then an object of the present invention to provide a novel modular structural framing system.

It is further an object of the present invention to provide such a novel framing system providing an optimum of design flexibility with concurrent engineering analysis for safe, trouble-free building.

It is further an object of the present invention to provide such a novel framing system having a high strength-to-weight ratio for structural support.

It is further an object of the present invention to provide such a novel framing system which is quick and easy to assemble without the use of tools thereby reducing labor costs and with a connection strength for safety and durability.

It is further an object of the present invention to provide such a novel framing system reducing the time for structural component assembly as well as the construction of the resulting structures from the assembled components, which is especially important when time is a constraint in the assembly and construction of the structures being built.

It is further an object of the present invention to provide such a novel framing system having modular interlocking components interconnectable at multiple locations on all sides and at the ends.

It is further an object of the present invention to provide such a novel framing system requiring fewer components to save in unnecessary inventory build-up and cost.

It is further an object of the present invention to provide such a novel framing system allowing all sizes of beams, columns, intersections for different loads, spans, and working heights to be made from the same components and specifically does not require different size trusses or space frames for different loads and spans.

It is further an object of the present invention to provide such a novel framing system which can be stored and transported knocked-down.

It is further an object of the present invention to provide such a novel framing system utilizing structural members (and particularly cubes) formed from a common, locking panel which can be formed by a manufacturing process utilizing a single tool, die, or the like.

It is further an object of the present invention to provide such a novel framing system providing hollow structural members connected together with passage therebetween.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "interior", "exterior", "face", "edge", and similar terms are used herein, it should be understood that these terms have reference only to the structure shown in the drawings as it would appear to a person viewing the drawings and are utilized only to facilitate describing the invention.

DESCRIPTION

A modular structural framing system according to the preferred teachings of the present invention is shown in the drawings and generally designated 10. In the most preferred embodiment of the present invention, system 10 is an improvement of the type shown and described in International Publication No. WO 93/12345. For purpose of explanation of the basic teachings of the present invention, the same numerals designate the same or similar parts in the present figures and the figures of International Publication No. WO 93/12345. The description of the common numerals and system 10 may be found herein and in International Publication No. WO 93/12345, which is hereby incorporated herein by reference.

Figure 1:
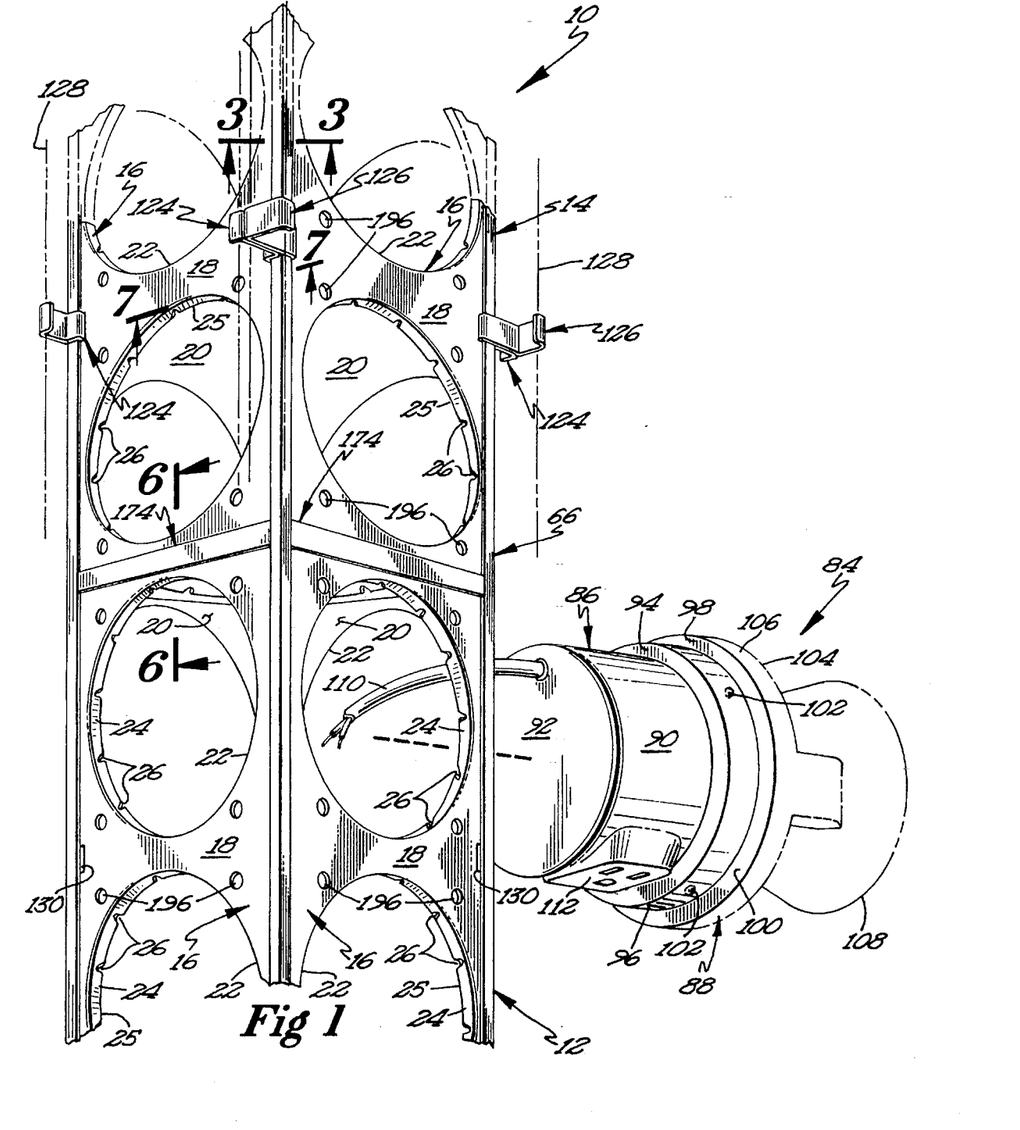
FIG. 1 shows an exploded, perspective view of a modular structural framing system according to the preferred teachings of the present invention, with portions being shown in phantom.

System 10 includes first and second, hollow, structural truss members 12 and 14 shown in a preferred form as hollow parallelepipeds, and in the preferred form as right parallelepipeds including but not limited to cubes. Specifically, hollow structural members 12 and 14 include attachment panels 16 secured by their edges to form and define the hollow interior, with panels 16 being planar when members 12 and 14 are in the form of parallelepipeds and being generally of the same size and shape when members 12 and 14 are in the form of cubes. Panels 16 include first, exterior faces 18 and second, interior faces 20 defining a panel thickness. Interconnect ports 22 of the same shape and size are formed in each of panels 16 extending through faces 18 and 20, with ports 22 being symetrical in the preferred form and shown as being cylindrical in shape in the most preferred form. A tube 24 having a cross section corresponding to the shape of port 22 integrally extends from panel 16 beyond second, interior face 20, with tube 24 having a free end defining a third panel face 25 generally parallel to and spaced from faces 18 and 20. Notches 26 are formed in the free end of tube 24 and are circumferentially spaced from each other such as 30° apart. Tube 24 is generally cylindrical-shaped and in the most preferred form is frusto-conical in shape and extends at an obtuse angle relative to face 20, with the frusto-conical shape allowing nesting of panels 16 during storage and/or transport.

Figure 2:
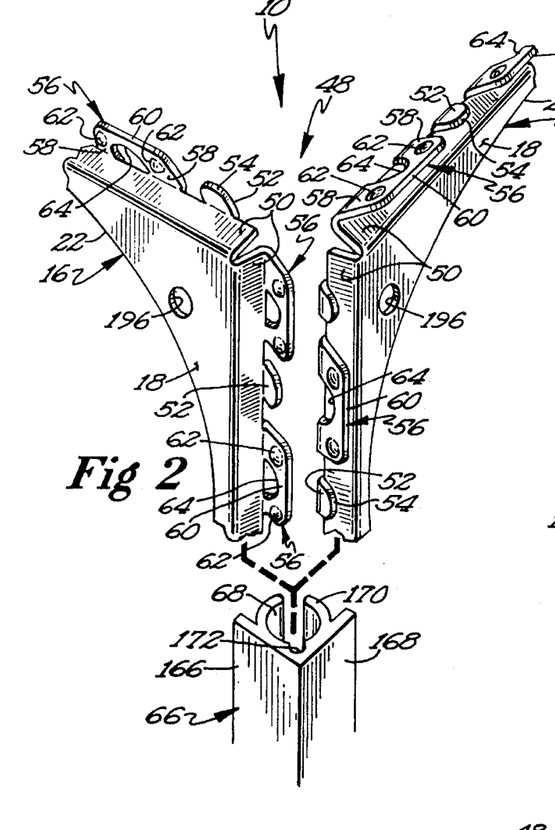
FIG. 2 shows a partial, exploded, perspective view of the modular structural framing system of FIG. 1.
Figure 3:
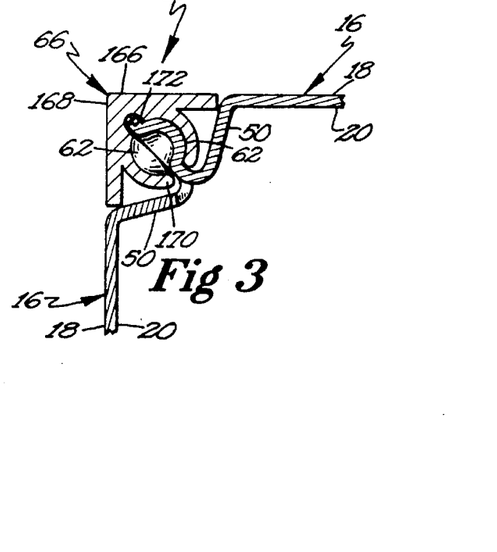
FIG. 3 shows a cross-sectional view of the modular structural framing system of FIG. 1 according to section line 3—3 of FIG. 1.

In the most preferred form of the present invention, system 10 further includes provisions 48 for removably securing the edges of planar panels 16 to form three-dimensional members 12 and 14. Specifically, the edges of panels 16 terminate in a connecting flange 50 extending at an obtuse angle in the order of 105° relative to face 20. A plurality of lugs 52 extend at an acute angle in the order of 60° from and equally spaced along the free edge of flange 50 in an exterior direction. The free edges 54 of lugs 52 are generally perpendicular to the faces of lugs 52, with lugs 52 being generally semicircular in shape. A plurality of latches 56 extend generally at an acute angle in the order of 60° from and equally spaced along the free edge of flange 50 in an exterior direction, with latches 56 being located intermediate lugs 52. Latches 56 are generally U-shaped including first and second legs 58 having their first ends connected to flange 50 and spaced a distance generally equal to and for slideable receipt of lugs 52. The second ends of legs 58 are connected to a head 60 extending between legs 58. Head 60 further includes a lower edge 64 spaced from the free edge of flange 50 of panel 16 generally equal to the length of lugs 52 and for receipt of free edges 54 of lugs 52. Detent portions 62 are formed in legs 58 adjacent their second ends and adjacent head 60, with portions 62 being semispherical in shape and extending towards flange 50. Thus, latches 56 have a generally L-shape.

It should then be noted that lugs 52 of a first panel 16 are slideably received in latches 56 of a second panel 16 between legs 58, with edges 64 abutting and hooking with edges 54, and with lugs 52 of the second panel 16 being slideably received in latches 56 of the first panel 16. Thus, it can be appreciated that panels 16 are disengagably divergent generally in a plane in the order of 45° from opposing panels 16 and yet are locked when engaged with forces imposed at 90° to engaged panels 16. In the hooked relation, lugs 52 and latches 56 have a generally T-shaped end view and in the most preferred form have a generally cross-shaped end view, with lugs 52, legs 58 and heads 60 aside from detent portions 62 lying within the same plane and defining the leg of the T-shaped end view. Detent portions 62 intersect the plane of lugs 52, legs 58, and heads 60 at a nonlinear angle, with detent portions 62 from the first panel 16 extending in a first direction and extending in the opposite direction from the second panel 16 in the preferred form to define the head of the T-shaped end view. Provisions 48 further include a connector 66 for holding lugs 52 in latches 56. In the preferred form, connector 66 is a slide connector and slideably receives lugs 52 and latches 56. Specifically, connector 66 in the preferred form includes a first plate 166 and a second plate 168 interconnected together at right angles. Located between and integrally connected to plates 166 and 168 is a tube 170 having a generally circular cross section for slideable receipt of detent portions 62. A diagonal cut 172 extends through tube 170 and at an angle of 45° to plates 166 and 168 and for slideable receipt of lugs 52, legs 58, and heads 60. Thus, cut 172 and the interior of tube 170 form a T-shaped slot 68 of a size for slideable receipt upon the T-shaped end view of lugs 52 and latches 56 in their hooked relation.

It can then be appreciated that panels 16 can be of a standardized design and in the case of a cube, can be of identical construction, with panels 16 having different orientations to arrange lugs 52 and latches 56 in their hooking relation to form members 12 and 14. Further, it can be appreciated that panels 16 including lugs 52 and latches 56 can be stacked with faces 18 and 20 in an abutting relation to save space during storage and/or transport (with the nesting of tubes 24 in the most preferred form). It should further be noted that the angular relation of flanges 50 allows provisions 48 to be flush with faces 18 of panels 16 assembled into members 12 and 14.

Figure 5:
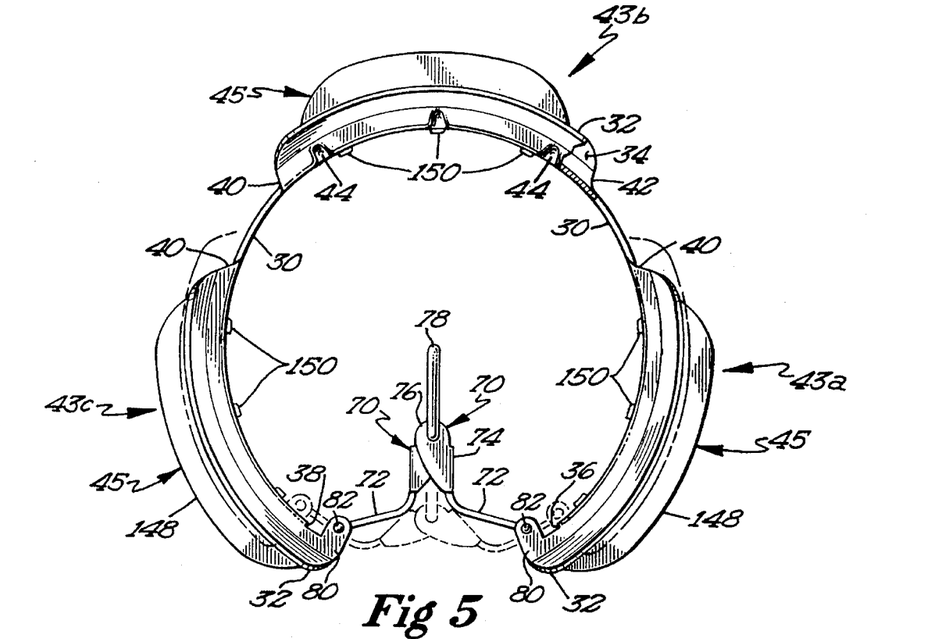
FIG. 5 shows a top, plan view of the clamp of the modular structural framing system of FIG. 1 in its insertion shape.
Figure 6:
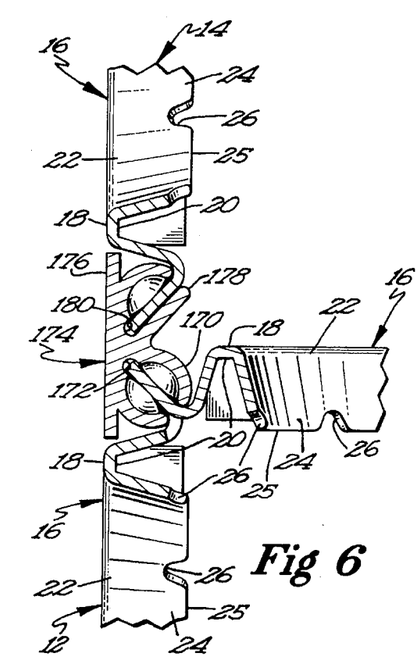
FIG. 6 shows a cross-sectional view of the modular structural framing system of FIG. 1 according to section line 6—6 of FIG. 1.
Figure 7:
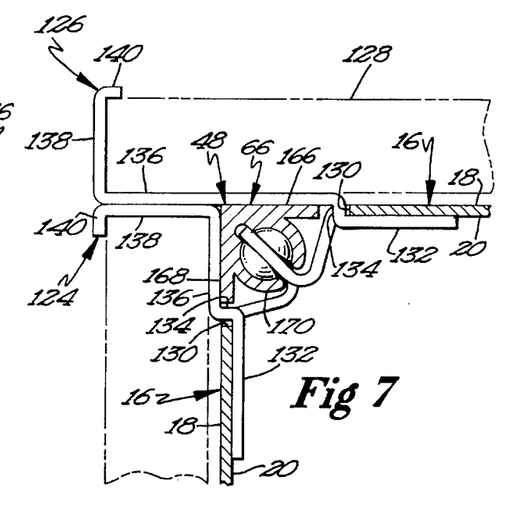
FIG. 7 shows a cross-sectional view of the modular structural framing system of FIG. 1 according to section line 7—7 of FIG. 1.
Figure 8:
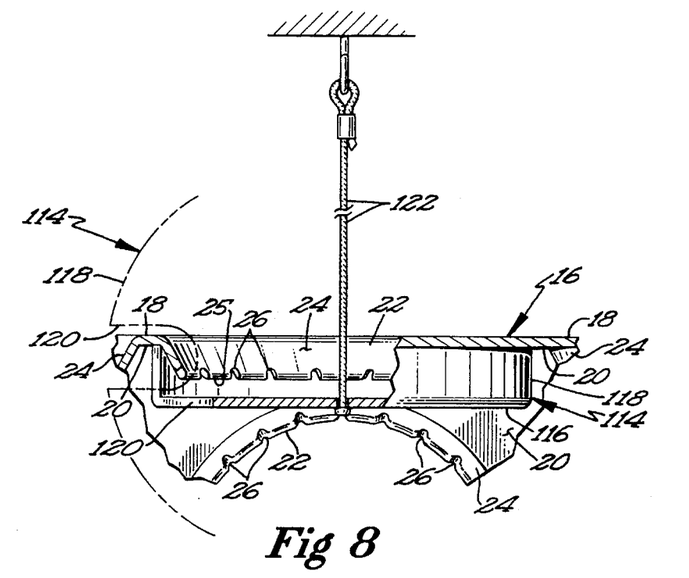
FIG. 8 shows a partial, cross-sectional view of the modular structural framing system of FIG. 1.

System 10 in the most preferred form of the present invention further includes a clamp for removably connecting first and second structural members 12 and 14 together. Generally, clamp 28 includes a primary band having a central wall 30 and outwardly directed first and second side walls 32 and 34 extending from the first and second edges of wall 30. Walls 30, 32, and 34 have a generally channel-shaped or U-shaped transverse cross section. Wall 30 has a width between side walls 32 and 34 which is generally equal to twice the width between first and third faces 18 and 25 of panel 16. Walls 32 and 34 extend from wall 30 at an angle corresponding to the angle of tube 24 with face 20, and in the preferred form is at an obtuse angle. The primary band has a length which is less than the periphery of ports 22 and is generally annular but U-shaped. In the preferred form, the primary band includes provisions allowing its removable location in ports 22 of panels 16. Specifically, in the preferred form, the primary band is split and includes first and second free ends 36 and 38 in wall 30. First and second, circumferentially spaced, flex notches 40 are formed in wall 32 generally diametrically opposite to free ends 36 and 38. First and second, circumferentially spaced, flex notches 42 are formed in wall 34 generally diametrically opposite to free ends 36 and 38, with the circumferential spacing between notches 40 and between notches 42 being complementary to each other and in the preferred form being equal. Notches 42 are at the same circumferential location as notches 40 to allow wall 30 to flex. Notches 40 and 42 in the preferred form divide the primary band into three portions 43a, 43b, and 43c integrally interconnected by the portions of wall 30 extending between notches 40 and 42 acting as hinges, with portion 43a including end 36, portion 43c including end 38, and portion 43b located intermediate portions 43a and 43c. Thus, the primary band can be distorted from a normal shape which is generally annular but U-shaped and of a size smaller than and for insertion into ports 22 to a shape which is generally annular but U-shaped of a size generally equal to ports 22. Circumferentially spaced detents 44 can be formed in the primary band of a size, shape, number, and position for receipt in notches 26 of tube 24, with detents 44 located exclusively in portion 43b in the preferred form shown. Detents 44 are formed by stamping side walls 32 and 34 in the most preferred form, with it being possible to form panels 16 and the primary bands by other processes including but not limited to die casting, vacuum forming and the like.

In the most preferred form, clamp 28 further includes positioning ears 45 extending generally perpendicular to wall 30 in each of portions 43a, 43b, and 43c. Specifically, in the preferred form, ears 45 are planar and include a radially inner edge 146 of an arcuate shape which corresponds to and abuts with wall 30. Ears 45 further include a radially outer edge 148 of an arcuate shape of a size having a radial extent larger than walls 32 and 34 and to extend upon and abut with face 18 of panels 16 whether clamp 28 is in its distorted shape or its normal shape. Ears 45 have a circumferential extent less than and located within walls 32 and 34 between notches 40 and 42. In the most preferred form, ears 45 are secured to portions 43a, 43b, and 43c by passing radially outer edge 148 of ears 45 through a slot formed in wall 30 intermediate walls 32 and 34 until radially inner edge 146 is positioned to correspond to wall 30. Small tabs 150 integrally extending in opposite directions from inner edge 146 generally perpendicular to ears 45 abut with and can be secured to wall 30 such as by welding to attach ears 45 to portions 43a, 43b, and 43c in the preferred form.

Clamp 28 further includes first and second secondary bands 70 each including a first leg 72 having a width substantially equal to the width of central wall 30. A second leg 74 extends from an end of each leg 72 at an obtuse angle in the order of 115°. Second legs 74 include first and second, pivot ears 76 extending perpendicular to and on opposite sides of legs 74 and extending forwardly of the ends thereof opposite to legs 72. A pull ring 78 extends through ears 76 of first and second secondary bands 70 to pivotally relate first and second secondary bands 70. The free ends of legs 72 are pivotally mounted adjacent to free ends 36 and 38 of wall 30 of the primary band. In the most preferred form, walls 32 and 34 each include L-shaped tabs 80 extending forwardly of ends 36 and 38 of wall 30 and radially inwardly thereof. Legs 72 each include first and second ears 82 integrally extending on opposite sides of and adjacent the ends thereof opposite legs 74. Ears 82 are rotatably received in apertures formed in tabs 80 located generally in line with wall 30.

In the preferred form, clamp 28 is movable between an insertion shape and a normal shape. Particularly, ring 78 can be pulled radially inwardly until legs 74 are at a small acute angle approaching generally parallel to each other as shown in FIG. 5. In the insertion shape, ears 82 of legs 72 defining the pivot axes to the primary band and of free ends 36 and 38 are such that clamp 28 and specifically walls 30, 32, and 34, secondary bands 70, and pull ring 78 are of a size smaller than and for insertion into ports 22. Ring 78 can then be pushed radially outwardly as shown in phantom to increase the angle between legs 74 and increasing the spacing between ears 82 and free ends 36 and 38 to a maximum distance, with wall 30 and legs 72 of clamp 28 lying generally along a circle having a size generally equal to ports 22 and with legs 74 extending generally perpendicular to each other. Further radial outward movement of ring 78 causes clamp 28 to have a generally oval shape with legs 74 at a large obtuse angle approaching generally linearly to each other and with the spacing between ears 82 and free ends 36 and 38 decreasing from the maximum distance therebetween.

Due to the most preferred form of clamp 28 and particularly the flexibility of the primary band and the pivot locations of secondary bands 70 to each other and to the primary band, clamp 28 is biased into either of the insertion and oval shapes. Particularly, due to the tendency of the primary band to return to its normal shape and move free ends 36 and 38 closer together, an overcenter relationship is created between secondary bands 70. Particularly, with secondary bands 70 positioned in a center position with the maximum distance between ears 82 and free ends 36 and 38, any further movement of pull ring 78 radially outwardly will allow the primary band to return to its normal shape bringing free ends 36 and 38 closer together and biasing pull ring 78 to move to the oval shape. Similarly, with secondary bands 70 positioned in a center position with the maximum distance between ears 82 and free ends 36 and 38, any further movement of pull ring 78 radially inwardly will allow the primary band to return to its normal shape bringing free ends 36 and 38 closer together and biasing pull ring 78 to move to the insertion shape.

Now that the basic construction of system 10 according to the preferred teachings of the present invention has been explained, the operation and further subtle features of system 10 can be set forth and appreciated. Specifically, in the preferred form, when structural members 12 and 14 are desired to be attached together, clamp 28 can be placed in its insertion shape such that side wall 32 for the sake of example can pass into and through port 22 of member 12 at the desired attachment position of member 12 and until ears 45 abut with face 18 of panel 16 outside of port 22. Clamp 28 can then be released from its insertion shape and will move toward its center position such that clamp 28 will be loosely held in port 22 by sandwiching port 22 between wall 32 and ears 45 of clamp 28. At that time port 22 of member 14 at the desired attachment position of member 14 can be aligned with clamp 28 held in port 22 of member 12. Port 22 of member 14 can then be slid over wall 34 of clamp 28 until face 18 of panel 16 outside of port 22 of member 14 abuts with ears 45 of clamp 28. It may be required that clamp 28 be moved at least towards its insertion shape to allow port 22 of member 14 to be slid over wall 34 of clamp 28. It can then be appreciated that clamp 28 also is loosely held in port 22 of member 14 by sandwiching port 22 of member 14 between wall 34 and ears 45 of clamp 28. Additionally, it can be appreciated that ears 45 of clamp 28 will be sandwiched between faces 18 of members 12 and 14. At that time, pull ring 78 can be pushed radially outwardly moving clamp 28 from its insertion shape towards its center position and oval shape with side walls 32 and 34 located on opposite sides of faces 25 of the abutting panels 16, clamp 28 will conform to an annular, clamping shape of a size corresponding to ports 22 of the abutting panels 16 and specifically with wall 30 and legs 72 being generally circular and abutting with tubes 24 when clamp 28 reaches its center position, and with side walls 32 and 34 abutting with faces 25 and sandwiching tubes 24 of the abutting panels 16 together. It should then be noted that the angular relation of walls 32 and 34 to wall 30 acts as a camming surface for faces 25 to draw members 12 and 14 together. Further, the complementary angular relation of tubes 24 to face 20 and of walls 32 and 34 to wall 30 causes tubes 24 to abut walls 32 and 34 at a perpendicular angle for increased force transfer.

Further pushing of pull ring 78 radially outwardly moves clamp 28 from the center position towards its oval shape and into its connecting shape when abutment of legs 72 with ports 22 prevents further movement, with the portion of pull ring 78 defining the axis between secondary bands 70 abutting tube 24 in the most preferred form. However, it can be appreciated that due to the overcenter relationship of secondary bands 70, clamp 28 is biased from its connecting shape toward the oval shape and will be biased against moving toward the center position and the insertion shape.

It should be appreciated that members 12 and 14 can have any rotational relation relative to each other, with notches 26 of members 12 being axially aligned with notches 26 of member 14 in the most preferred form. It should further be noted that when wall 30 extends across and abuts with tubes 24, detents 44 of clamp 28 are received in notches 26 to prevent panels 16 of members 12 and 14 from rotating relative to clamp 28 and thus relative to each other. It can be appreciated that to change the rotational position of members 12 and 14 relative to each other, clamp 28 can be moved from its clamping shape and center position towards its insertion shape sufficiently to remove detents 44 from notches 26 (but with portions of walls 32 and 34 being within the axial extent of tubes 24) and allow rotation of member 12 and/or 14 relative to clamp 28 until the desired notches 26 are circumferentially aligned with detents 44. Once members 12 and/or 14 are in the desired rotational position, clamp 28 can be moved to its clamping shape and receive detents 44 in notches 26.

It can then be appreciated that clamp 28 of the most preferred form is advantageous. Specifically, positioning detents 44 only in portion 43b allows advantageous securement of clamp 28 in ports 22. Particularly, portion 43b of clamp 28 can be positioned and forced to abut with ports 22 to hold members 12 and 14 in the desired rotational position. While portion 43b is held, pull ring 78 can be pushed radially outwardly to move portions 43a and 43c and legs 72 toward and for abutting with ports 22. The lack of detents 44 in portions 43a and 43c allow them to readily move into position without difficulty while detents 44 of portion 43b hold members 12 and 14 in the desired relative angular position. Likewise, ears 45 allow clamp 28 to be temporarily held in one or both members 12 and 14 and eliminates requiring the user to attempt to hold and maneuver three independent components, i.e. members 12 and 14 and clamp 28 during attachment. The advantages of ears 45 are especially important in allowing assembly by relatively unskilled labor without prior experience in assembling system 10 and in allowing more rapid assembly by labor having prior experience in assembling system 10.

It should then be noted that if a compression force is placed on members 12 and 14, faces 18 of the abutting panels 16 abut. If a tension force is placed between members 12 and 14, faces 25 of the abutting panels 16 abut with side walls 32 and 34 in a generally perpendicular manner to prevent separation of panels 16. If a shear force is placed between members 12 and 14, wall 30 abuts with tubes 24 to prevent relative movement between members 12 and 14. It should then be appreciated that shear forces between members 12 and 14 are contained by clamp 28 which is placed under compression forces and which is unable to collapse with circumferential forces due to the pivotal connections between secondary bands 70 and to the primary band. If a force is placed on members 12 and 14 which would tend to produce relative rotation therebetween, detents 44 of clamp 28 abut with notches 26 of panels 16 of members 12 and. 14 to prevent such relative rotation. It should then be noted that forces placed on members 12 and 14 will typically be a combination of compression, tension, shear, and rotation forces.

To allow separation of members 12 and 14, clamp 28 can be moved from its clamping shape, to its center position and to its insertion shape and specifically to allow its removal from ports 22 of the abutting panels 16 and passage to the hollow interior of member 12 or 14 and through an exterior port 22 thereof. It can be appreciated that due to the overcenter relationship of secondary bands 70, clamp 28 is biased to its insertion shape once clamp 28 is moved from its clamping shape beyond the center position and will be biased against moving toward the center position and the oval shape. With removal of clamp 28, the abutting panels 16 of members 12 and 14 are not clamped together and can be separated or otherwise moved relative to each other.

According to the preferred teachings of the present invention, in addition to being of complementary shapes for abutting with each other, the interconnect or abutting faces 18 of members 12 and 14 are of an identical, contiguous abutting configuration, and specifically system 10 according to the preferred teachings of the present invention does not require the interconnect faces to be of an interfacing male/female variety. Thus, system 10 allows members 12 and 14 to have unlimited and unrestricted interconnect options and orientations at the ends or along the sides of members 12 and 14 or any structure formed therefrom. Further, system 10 does not require radial translation or displacement of members 12 and 14 relative to each other for connection or disconnection thereof. Additionally, in the most preferred form, members 12 and 14 of system 10 can be clamped together or be unclamped without the use of tools. Further, ports 22 of the adjacent panels 16 are self-aligning with the positioning of clamp 28 therein. Thus, members 12 and 14 can be easily and rapidly clamped together or separated with minimal skill required.

Further, it should be appreciated that open passage or communication is allowed through clamp 28 to the hollow interiors of the connected structural members 12 and 14 in the assembled condition of system 10 according to the teachings of the present invention. Thus, electrical, gas, or other fluid lines can be located and pass within the interior of system 10 in its assembled condition. Additionally, clamping of members 12 and 14 is accomplished within and located in ports 22 of the abutting panels 16 and specifically members located exteriorly of ports 22 are not required. For example, a panel 16 having a square configuration could be interconnected to a panel 16 having the same configuration or a different configuration including but not limited to rectangular, circular, or triangular and can be held at any desired angular orientation relative thereto by notches 26 and detents 44.

System 10 according to the preferred teachings of the present invention further includes provisions 84 for attaching or otherwise mounting accessories to structural members 12 and 14. Provisions 84 generally include a generally cylindrical sleeve 86 and a cover 88. Sleeve 86 generally includes a first cylindrical portion 90 of an elongated axial length and a diameter less than tubes 24 of ports 22. The first end of portion 90 is closed by an integral end plate 92. An annular plate 94 extends integrally and generally perpendicularly to the opposite end of portion 90. The first end of a second cylindrical portion 96 integrally extends generally perpendicularly from the outer periphery of plate 94. Portion 96 has an axial length longer than tubes 24 and a diameter generally equal to and for slideable fit in the end of tube 24 at face 25. An annular plate 98 extends generally perpendicularly to the opposite end of portion 96. The first end of a third cylindrical portion 100 integrally extends generally perpendicularly from the outer periphery of plate 98. Portion 100 has an axial length greater than that of portion 96 and a diameter larger than ports 22 and tubes 24. The opposite end of portion 100 forms the open end of sleeve 86. In the preferred form, sleeve 86 is held in ports 22 of structural members 12 and 14 due to the slideable interfit of portion 96 inside of tubes 24. In the most preferred form, a multiplicity of detents 102 such as three are formed in portion 96 spaced from plate 98 generally equal to the distance between faces 18 and 25. Detents 102 have a radial extent from portion 96 and a size generally for slideable receipt through notches 26 but which abut with face 25 of tube 24 intermittent notches 26. Sleeve 86 can then be inserted in any port 22 of structural member 12 and 14 by sliding portion 90 therein and rotating sleeve 86 until detents 102 are axially aligned with notches 26. Portion 96 can then be slid into port 22 until plate 98 abuts with face 18 of panel 16 (which will typically hold sleeve 86 in port 22 due to the slideable interfit with tube 24 in the preferred form). At that time, sleeve 86 can be rotated in port 22 until detents 102 are not in axial alignment with notches 26 and abut with face 25 of tube 24 intermittent notches 26. Thus, detents 102 prevent portion 96 from being slid from tube 24 of port 22, and sleeve 86 is retained in port 22.

Cover 88 generally includes a circular end plate 104 having a cylindrical flange 106 integrally extending generally perpendicularly from the outer periphery thereof. Flange 106 has a size and shape for slideable receipt on portion 100 of sleeve 86 and may be retained thereon by any suitable means such as by a screw extending through flange 106 and portion 100.

Accessories can then be mounted to and/or within provisions 84 as desired. For example, a low voltage lamp 108 can be mounted to cover 88 as shown. An electric supply cable 110 can pass through end plate 92 into the interior of provisions 84 for electric connection to a suitable transformer, not shown, for lamp 108. An electrical outlet 112 can be mounted to and extend through a suitable aperture in portion 90 in a non-interfering manner with the slideable receipt and removal of provisions 84 in ports 22. Similarly, other accessories such as but not limited to telephone, computer, communication, and similar jacks and equipment can be mounted to and within provisions 84.

System 10 according to the preferred teachings of the present invention further includes provisions 114 for hanging, supporting, or otherwise attaching accessories and/or structural members 12 and 14. Generally, in the preferred form, provisions 114 include circular end plate 116 having cylindrical flange 118 integrally extending perpendicularly from the outer periphery thereof. The outer periphery of end plate 116 and flange 118 have a diameter larger than ports 22 and tubes 24. In the most preferred form, end plate 116 and flange 118 of provisions 114 are identical to end plate 104 and flange 106 of cover 88 to reduce production costs. Provisions 114 further include a U-shaped channel 120 extending radially from a point on flange 118 and the outer periphery of end plate 116 to a point spaced from the center of end plate 116. Channel 120 has a width larger than the distance between faces 18 and 25 and a length such that the spacing between the end of channel 120 and a point on flange 118 diametrically opposite thereto is less than the diameter of ports 22 and tubes 24. Provisions 114 further include a support member in the preferred form of a cable 122 passing through an aperture formed in end plate 116 preferably at the center thereof and having an enlarged end which is not able to pass through the aperture of end plate 116.

To install provisions 114, end plate 116 is positioned outside of structural member 12 or 14 to be generally perpendicular to panel 16, port 22, and tube 24. At that time, channel 120 can be slid on tube 24 until end plate 116 and flange 118 diametrically opposite to channel 120 is within the diametric extent of port 22 and tube 24. End plate 116 and flange 118 can then be pivoted in a plane generally perpendicular to panel 16, port 22, and tube 24 about an axis defined by the abutment of channel 120 on tube 24 until end plate 116 and flange 118 can be slid from tube 24 and into the interior of structural member 12 or 14. End plate 116 can then be turned to be positioned generally parallel to faces 20 and 25 and concentric to port 22 and tube 24. Flange 118 can then be moved to abut with face 20 outside of and concentric to tube 24. It can then be appreciated that cable 122 can extend downwardly from end plate 116 to hang artwork, accessories, other structural members 12 and 14, or the like. Additionally, cable 122 can extend upwardly from end plate 116 to hang structural member 12 or 14 from an overhead point to which cable 122 is suitably secured.

Furthermore, to close structural members 12 and 14 according to the preferred teachings of the present invention, suitable covers can be snap fit or otherwise secured in the exterior ports 22 of members 12 and 14 and/or in clamp 28 in its clamping shape. In a preferred form, the covers can include mounting provisions such as for electrical outlets or switches, or for other accessories such as lamps, knock-out provisions for passage of wiring, motor shafts, and the like, or other provisions for hanging, supporting, or otherwise attaching accessories and the like according to the preferred use of system 10 according to the preferred teachings of the present invention. Although in the preferred form ports 22 are formed in all surfaces of members 12 and 14 and is believed to be advantageous in maximizing the number of interconnect locations and options, members 12 and 14 could include panels 16 without the presence of ports 22 to enclose the interior of members 12 and 14 if desired.

Structural members 12 and 14 according to the preferred teachings of the present invention can have a variety of forms and shapes. Particularly, members 12 could be a wall having port 22. Likewise, members 12 and 14 could have elongated shapes of a fixed or variable length and including multiple ports 22 along its elongated length such that interconnection can be made at any one or any combination of ports 22. Likewise, members 12 and/or 14 could be wedge-shaped or arch-shaped of either a fixed or variable angle to allow interconnection of members 12 and 14 into an arch-like structure or could be in the form of corner stiffeners. Likewise, members 12 and/or 14 could be in the shape of a node for a space frame. Likewise, although panels 16 are shown as being planar, panels 16 can have other configurations which have a complementary, abutting relation.

It should further be appreciated that system 10 according to the teachings of the present invention can be universally applied to make all size beams, columns, intersections, etc. for different loads, spans, and working heights with the same modular components. Specifically, members 12 and 14 can be connected end-to-end for the desired length and/or can be connected side-to-side for the desired cross-sectional size. Likewise, members 12 and 14 can be interconnected at multiple locations on all sides and ends to form the desired frame or structural element. As system 10 according to the teachings of the present invention does not require different size trusses or space frames designed or engineered for different loads and/or spans but rather allows modular construction according to the particular application, fewer component parts are required, saving in unnecessary inventory build-up and cost for the manufacturer, retailer, and user of system 10. Further, the modular construction and multiple interlocking locations provided by system 10 according to the teachings of the present invention allow the relatively few components to provide more freedom and design versatility to meet the most demanding architectural applications or designs.

In the most preferred form of the present invention, provisions 48 of system 10 further include a connector 174 for connecting side panels 16 of members 12 and 14 in an end-to-end relation and for simultaneously connecting an end panel 16 to member 12. Generally, connector 174 includes an extended plate 176. Tube 170 having a generally circular cross section is secured to the inside face of extended plate 176 and extends along an edge thereof. Diagonal cut 172 extends through tube 170 and at an angle of 45° to plate 176, with cut 172 and the interior of tube 170 forming T-shaped slot 68 for slideable receipt upon the T-shaped end view of lugs 52 and latches 56 of end panel 16 of member 12 in their hooked relation with the side panels 16 of member 12. Thus, connector 174 removably attaches end panel 16 to side panels 16 of member 12 in a similar manner as connector 66, with the outside faces of plates 176 being linear and contiguous with faces 18 of side panels 16 of member 12. Connector 174 further includes a tube 178 having a generally semicircular cross section secured to the inside face of plate 176 and extending along the other edge of plate 176 in a fixed positional relationship to slot 68. A diagonal cut 180 extends through tube 178 adjacent to the flat side of the semicircular cross section and at an angle of 45° to plate 176 and at an angle of 90° to cut 172. Cut 180 and the hollow interior of tube 178 of each connector 174 forms an L-shaped slot for slideable receipt upon lugs 52 and latches 56 of a single panel 16 which is not hooked or otherwise interconnected to another panel 16. Thus, connector 174 further removably attaches the end edges of side panels 16 of member 14 to member 12 in an end-to-end relation, with the outside faces of plates 176 being linear and contiguous with faces 18 of side panels 16 of member 14. In the most preferred form, connector 174 has a length generally equal to the width of face 18 along an end edge of members 12 and 14. Additionally, connectors 66 for removably attaching the side edges of side panels 16 of members 12 and 14 are continuous and integral between members 12 and 14 and any additional structural truss members 12 and 14, with connectors 66 sliding on lugs 52 and latches 56 of the side edges of side panels 16 past the ends of connectors 174 connecting side panels 16 of members 12 and 14 in an end-to-end relation.

It can then be appreciated that utilizing connectors 174 and continuous connectors 66, structural members of any desired length can be created from members 12 and 14 (formed of typically two component parts, i.e. rectangular shaped for side panels 16 and square shaped for end panels 16) connected in an end-to-end relation. As panels 16 are typically formed by stamping or molding, only two types of molds are required and only two types of component parts are required for panels 16. On the other hand, connectors 66 and connectors 174 are typically formed by extrusion such that only two types of molds are required and the length of the extrusion can be cut to the desired lengths. Thus, capital costs for production and inventory of the component parts are minimized according to the preferred teachings of the present invention.

It should also be appreciated that system 10 according to the preferred teachings of the present invention has a high strength-to-weight ratio for structural support. In this regard, it should be noted that the bends forming tubes 24 and flanges 50 in the most preferred form provide enhanced structural strength and stability to panel 16 to allow the thickness between faces 18 and 20 to be minimized, with such minimization being advantageous in reducing the material and thus the cost of manufacture and in reducing the storage/transport size of panels 16 in their knocked-down, nested, stacked condition. Similarly, although assembly of system 10 can be quickly and easily performed without the use of tools, the connection strength provided by clamp 28 between members 12 and 14 is to a factor of four for safety and durability according to the teachings of the present invention.

Figure 10:
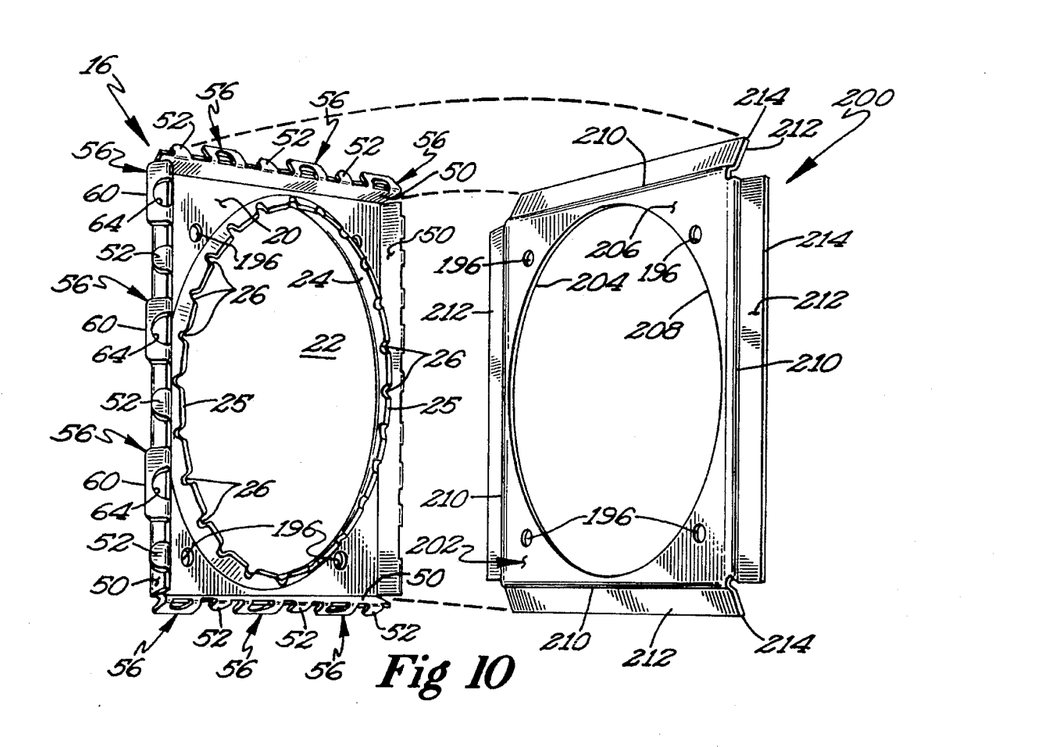
FIG. 10 shows an exploded, perspective view of the stiffener of the end panel of the modular structural framing system of FIG. 1.

To increase the load strength of system 10 against an axial force placed between members 12 and 14 interconnected by clamp 28, a stiffener 200 can be provided for end panels 16 interconnected by clamp 28. In the preferred form shown, stiffener 200 includes a panel 202 including a first, exterior face 204 and a second, interior face 206 defining a panel thickness. An aperture 208 extends through faces 204 and 206 of a size and shape for receipt of tubes 24 and specifically of a size and shape slightly larger than the size and shape of the outside surface of tube 24 at face 25 and slightly smaller than the size and shape of the outside surface of tube 24 at face 20. Panel 202 has a size and shape corresponding and generally equal to panels 16 of a square shape. The side edges of panel 202 each terminate in a flange having a first portion 210 extending inwardly at an obtuse angle corresponding to the angle of connecting flange 50 relative to panel 16 and in the most preferred form in the order of 105° relative to face 206. The flanges of panels 202 each further include a second portion 212 extending at an obtuse angle in the order of 130° from first portion 210. Second portions 212 terminate in free edges 214 which are parallel to and spaced from the side edges of panel 202.

Figure 4:
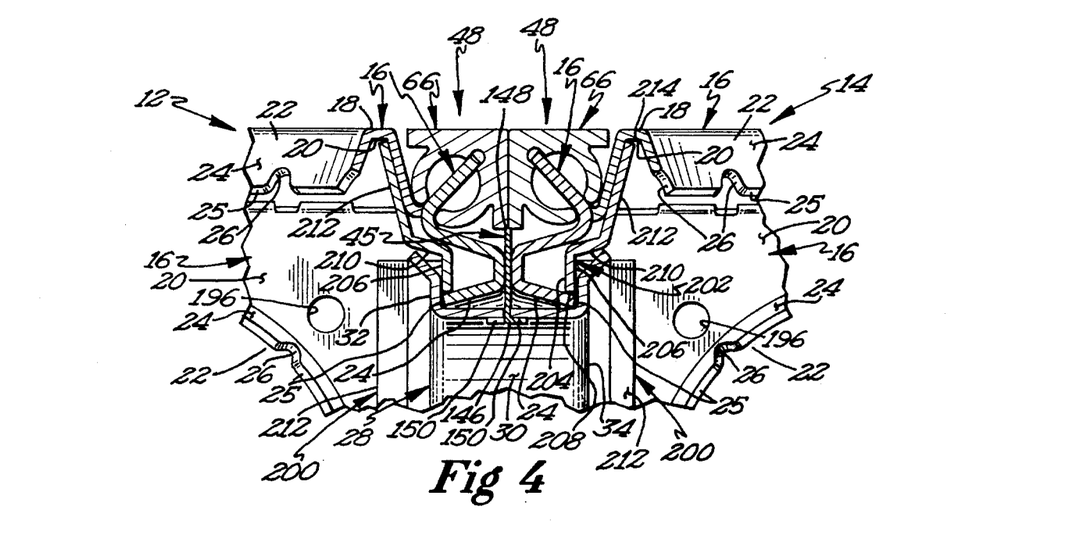
FIG. 4 shows a cross-sectional view of the modular structural framing system of FIG. 1.

In the preferred form, stiffener 200 can be nested with end panel 16 as shown in FIG. 4. Specifically, tube 24 of panel 16 can extend through aperture 208 with face 25 including notches 26 at least partially extending beyond face 206 but with aperture 208 sliding upon and nesting on tube 24. Additionally, first portions 210 of stiffener 200 can nest in and be slideably received in flanges 50 of end panel 16. The interconnection between portions 210 and 212 is located slightly beyond the free edge of flange 50, with portions 212 extending generally perpendicular to lugs 52 and legs 58 and heads 60 of latches 56. Surfaces 20 and 204 are generally in a closely spaced, parallel relation.

Members 12 and 14 are constructed with each end panel 16 thereof which is anticipated will be connected utilizing clamp 28 including stiffener 200. Specifically, one or more stiffeners 200 are nested in panel 16 forming the interconnecting end before its attachment to the side panels 16, with combined stiffener 200 and panel 16 being interconnected to side panels 16 utilizing connector 66 in the same manner as panel 16 would have been interconnected without stiffener 200. In the assembled member 12 or 14, free edges 214 abut with faces 20 of the side panels 16 adjacent to the side edges of side panels 16 and flanges 50. In the preferred form, portions 212 of the flanges of stiffener 200 abut with flanges 50 of side panels 16, with free edges 214 being slideably received between and abutting flanges 50 and tubes 24 at their point of minimum spacing.

It can then be appreciated that one or both members 12 and 14 including one or more stiffeners 200 can be connected together utilizing clamp 28 in the same manner as members 12 and 14 without stiffeners 200. However, when an axial force parallel to the axis of ports 22 is placed upon and which tends to separate members 12 and 14, such axial force is also transferred by stiffener 200 to side panels 16 secured to end panels 16 including ports 22 connected by clamp 28. Specifically, such an axial force would be distributed by clamp 28 to end panels 16 including ports 22 connected by clamp 28. According to the teachings of the present invention, such an axial force would be additionally distributed by clamp 28 to stiffener 200 which would in turn distribute such force to side panels 16 extending generally perpendicular to panels 16 including ports 22 connected by clamp 28 due to the abutment of free edges 214 and of portions 212 of the flanges of stiffener 200 with flanges 50 of side panels 16. Due to the distribution of force to side panels 16, system 10 utilizing stiffener 200 according to the preferred teachings of the present invention is able to handle larger axial loads.

Likewise, in the most preferred form, when an axial force parallel to the axis of ports 22 is placed upon and which tends to push together members 12 and 14, such axial force is also transferred by stiffener 200 to side panels 16 secured to end panels 16 including ports 22 connected by clamp 28. Specifically, such an axial force would be distributed to end panels 16 which are abutted together. According to the teachings of the present invention, such an axial force would be additionally distributed to stiffener 200 due to the nesting relationship with end panels 16 which would in turn distribute such force to side panels 16 extending generally perpendicular to the abutting end panels 16 due to the abutment of free edges 214 of the flanges of stiffener 200 with tubes 24 of side panels 16. Due to the distribution of force to side panels 16, system 10 utilizing stiffener 200 according to the preferred teachings of the present invention is able to handle larger axial loads.

Stiffener 200 of the preferred form shown according to the teachings of the present invention is believed to be particularly advantageous. Specifically, stiffener 200 is not in any way secured to panels 16 such as by welding, adhesive, or the like, but rather is held in members 12 and 14 due to its nesting relation with end panels 16 and the abutting relation with side panels 16. Thus, panels 16 are all of the same construction to reduce inventory and manufacturing expenses, with stiffeners 200 added during assembly of members 12 and 14 where necessary. It can then be appreciated that if members 12 and 14 are disassembled to allow configuration into a different shape, panels 16 and stiffeners 200 can be separated and reused at any desired location.

System 10 according to the preferred teachings of the present invention has a multiple of applications and uses. For example, system 10 could be utilized as a modular, changeable structure such as a habitat for gerbils, hamsters, or similar rodents. Similarly, system 10 could be utilized as truss structures for structures which are desired to be frequently torn down and set up such as trade show booths. It should be noted that system 10 is particularly advantageous as wiring, lights, and other electrical equipment can be located within the hollow interior of structural members 12 and 14 and of clamp 28. Further, system 10 is particularly advantageous due to its small (dense pack) containerization during deployment of large space structural members 12 and 14 and due to its ability to assemble and disassemble without the use of tools in a minimum amount of time, especially for use in outer space or underwater constructions. Additionally, system 10 could act as an external truss for a pipe or similar structure passing through the hollow interior of members 12 and 14. It should then be appreciated that if such a pipe were sized to fit tightly within ports 22, such pipe would increase the structural strength of system 10 or system 10 would also otherwise increase the load carrying capability across a pipe or reduce its deflection across the span according to the preferred teachings of the present invention.

Ports 22 can be utilized as attachment points for banners, shelves, and the like according to the teachings of the present invention. Also, connectors 66 and 174 can be manufactured with sufficient tolerances to allow a thin, flexible covering to extend over faces 18 and over lugs 52 and latches 56 and be sandwiched between connectors 66 and/or 174 and lugs 52 and latches 56, with the covering being utilized for any desired function such as a screen, or the like. Additionally, in the most preferred form, clips 124 and 126 can be utilized to hold panels 128 in system 10 to extend over faces 18 and/or span between spaced structural members 12 and 14. Particularly, in the most preferred form, gaps 130 are provided in flanges 50 and thus between lugs 52 and latches 56 of panels 16. Additionally, such gaps 130 are exposed between faces 18 of panels 16 and connectors 66 and 174 to define rectangular slits. Clips 124 and 126 are of a one-piece, bent design having a width generally equal to gaps 130. Generally, clips 124 and 126 each include a first leg portion 132, a second portion 134 extending continuously and perpendicularly to portion 132, a third portion 136 extending continuously and perpendicularly to portion 134 in a direction away from portion 132, a fourth portion 138 extending continuously and perpendicularly to portion 136 in a direction away from portion 134, and a fifth portion 140 extending continuously and perpendicularly to portion 138 in a direction over portion 136. The length of portions 138 of clips 124 and 126 is generally equal to the thickness of panel 128 to be held for slideable receipt of an edge between portions 136 and 140. The length of portions 134 of clips 124 and 126 is generally equal to the thickness between faces 18 and 20 of panels 16. The length of portion 136 of clip 124 in the preferred form is generally equal to the width of plate 166 or 168 of connector 66 while the length of portion 136 of clip 126 in the preferred form is generally equal to the width of plate 166 or 168 of connector 66 plus the thickness of panel 128 to be held. According to the teachings of the present invention, clips 124 and 126 are fastened to structural members 12 and 14 by first sliding the free end of portion 132 into and through a desired gap 130 until portion 134 abuts with face 18 of panel 16. At that time, clips 124 and 126 can be pivoted in gap 130 to position portion 134 in gap 130, to abut portion 132 with face 20 of panel 16, and to abut portion 136 with plate 166 or 168 of connector 66. It can then be appreciated that with clips 124 and 126 positioned in gaps 130 of adjacent panels 16 extending generally perpendicularly to each other, a first panel 128 can be slid to abut with portion 138 of clip 124 and be flush with face 18 of the perpendicular panel 16 whereas a second panel 128 can be slid to abut with portion 138 of clip 126 and be flush with the exterior face of the first panel 128 in the preferred form. However, it can be appreciated that the lengths of portions 136, 138, and 140 and the shapes and configurations of portions 138 and 140 of clips 124 and 126 can be varied to hold different thicknesses and types of panels 128 or to hold other accessories or the like.

Figure 9:
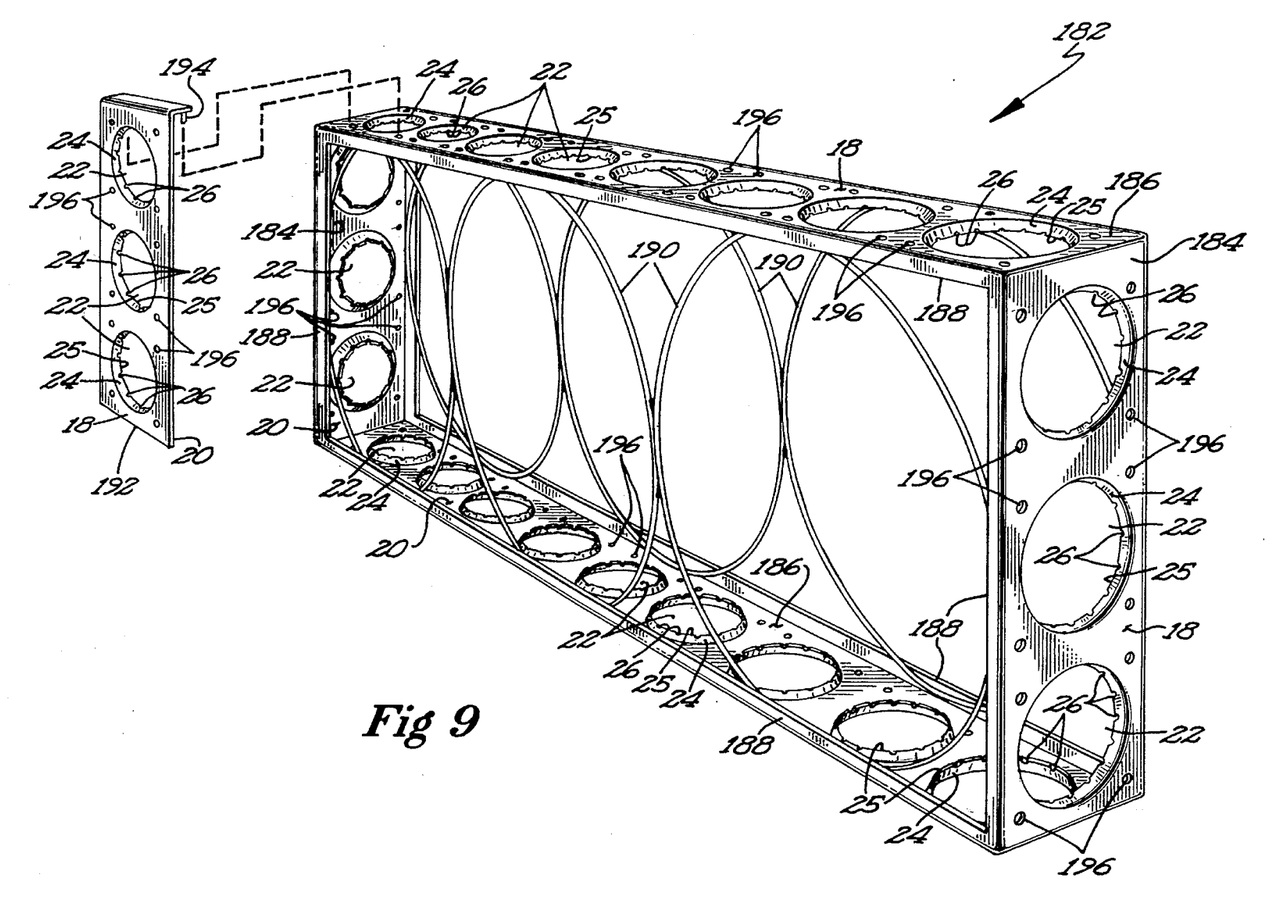
FIG. 9 shows an exploded, perspective view of the welded truss of the modular structural framing system of FIG. 1.

System 10 according to the preferred teachings of the present invention further includes a welded truss 182 which can be interconnected to members 12 and 14, other trusses 182, or the like. Specifically, truss 182 is in the shape of a right parallelepiped and includes first and second, parallel, spaced, panels 184 of equal length interconnected generally perpendicularly between third and fourth parallel, spaced, panels 186. Panels 186 have equal length which is a numerical multiple of the length of panels 184. Panels 184 and 186 are planar and include interconnect ports 22. Tubes 24 integrally extend from panels 184 and 186 and include notches 26 formed in the free ends thereof. Panels 184 and 186 each include first and second flanges 188 extending generally perpendicularly from the opposite edges thereof. Truss 182 further includes a plurality of rings 190 having circular shapes, with the circular shapes having diameters generally equal to the length of panels 184. Rings 190 are positioned in pairs in a spaced relation extending generally perpendicularly from the opposite edges of panels 184 and 186, with rings 190 being welded to flanges 188 at their abutment therewith. The number of pairs of rings 190 corresponds to the numerical multiple of the length of panels 184 for the length of panels 186, such that if panels 186 are three times the length of panels 184, three pairs of rings 190 are provided, with the rings 190 in each pair being welded where their peripheries abut. Rings 190 can be formed by any suitable method including but not limited to rolling, bending, stamping, or casting of any suitable stock material and can have cross sections of any suitable shape including but not limited to round or flat.

It can then be appreciated that truss 182 according to the teachings of the present invention is very resilient because load forces placed on truss 182 tend to bow and not bend rings 190 due to their arcuate nature. Straight braces commonly used in trusses will tend to bend under large load forces and will not return to a straight condition in a unstressed condition once bent. However, rings 190 do not bend but rather bow, allowing truss 182 to return to its unstressed condition after removal of the large load forces.

To allow interconnection to locations intermediate panels 184 and perpendicular to panels 184 and 186, L-shaped brackets 192 can be provided having first legs which extend over upper panel 186 and second legs which extend between and abut with flanges 188 of upper and lower panels 186. The second legs can include ports 22 and tubes 24 to allow interconnection thereto utilizing clamps 28 in the most preferred form. The first legs include downwardly projecting pins 194 parallel to the second leg and which are received in corresponding apertures 196 formed in upper panel 186. If desired, pins 194 can include cotter keys or the like to prevent undesired removal of pins 194 from apertures 196 from upward forces.

Now that the basic teachings of system 10 according to the preferred teachings of the present invention have been set forth, other variations will be obvious to persons skilled in the art. For example, although ports 22 are shown in the most preferred form as being cylindrical, ports 22 can have other shapes such as having octagonal or other multisided cross sections.

Although in the preferred form, notches 26 are formed in panels 16 and detents 44 are formed in clamps 28 and are believed to be advantageous for at least manufacturing reasons, it can be appreciated that the rotation preventing provisions can take other forms including being at reversed locations.

Likewise, although in the most preferred form, clamp 28 is removably located in ports 22 of structural members 12 and 14 due to its provisions for moving to an insertion shape, other provisions for removably locating clamp 28 in ports 22 can be provided. For example, structural members 12 and 14 could be separable to allow insertion of clamps 28 in an enlarged port 22 which is then reduced with the uniting of structural members 12 and 14 to capture clamps 28 therein.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Modular structural framing system comprising, in combination: first and second three-dimensional, hollow structural members each including an end panel having inside and outside faces and at least a first side edge, a side panel having an inside face and at least a first side edge, and means for removably securing the first edges of the end and side panels, with the inside faces of the end and side panels defining a hollow interior when the first edges of the end and side panels are removably secured; a stiffener comprising, in combination: a stiffener panel having a size, shape, and contour corresponding to the inside face of the end panel and having at least a first side edge, and a stiffener flange integrally connected and extending at a nonparallel angle to the side edge of the stiffener panel and terminating in a free edge, with the stiffener panel being held with the end panel and inside of the hollow interior with the free edge of the stiffener flange extending inside of the hollow interior and abutting with and transferring forces to the side panel inside of the hollow interior, with the outside faces of the end panels of the first and second structural members having complementary shapes for abutting with each other, with each of the first and second structural members having at least first ports formed therein, with the first ports extending through the outside faces of the panels of the first and second structural members and being of the same size; and a clamp comprising, in combination: a primary band having a central wall having first and second edges, first and second outwardly directed side walls extending from the first and second edges of the central wall respectively, with the walls having a generally channel-shaped transverse cross section, with the walls being flexible between an insertion shape allowing passage of the side walls through the ports and a connection shape with the central wall being inside and abutting the port, and at least a first outwardly directed ear extending from the central wall intermediate the side walls and having a radial extent greater than the side walls for abutting with the inside faces of the end panels of the first and second structural members.

2. Three-dimensional, hollow structural member comprising, in combination: an end panel having inside and outside faces and at least a first side edge; a side panel having an inside face and at least a first side edge; means removably securing the first edges of the end and side panels, with the inside faces of the end and side panels defining a hollow interior; and a stiffener comprising, in combination: a stiffener panel having a size, shape, and contour corresponding to the inside face of the end panel and having at least a first side edge; a stiffener flange integrally connected and extending at a nonparallel angle to the side edge of the stiffener panel and terminating in a free edge, with the stiffener panel being held with the end panel and inside of the hollow interior with the free edge of the stiffener flange extending inside of the hollow interior and abutting with and transferring forces to the side panel inside of the hollow interior.

3. The three-dimensional hollow structural member of claim 2 wherein the removably securing means comprises, in combination: a panel flange extending from the side edge of each of the end panel and the side panel at a nonparallel angle, with the free edge of the stiffener flange abutting with the panel flange of the side panel.

4. The three-dimensional, hollow structural member of claim 3 wherein the stiffener panel is removably held with the end panel by nesting of the stiffener flange within the panel flange of the end panel.

5. The three-dimensional, hollow structural member of claim 4 wherein the end panel includes a port extending through the inside and outside faces, with the end panel including a tube having a cross section corresponding to the shape of the port and extending from the end panel beyond the inside face, with the stiffener panel including an aperture for receipt of the tube.

6. The three-dimensional, hollow structural member of claim 5 wherein the tube is frusto-conical in shape and extends at an obtuse angle to the inside face of the end panel, with the aperture of the stiffener panel nesting on the tube.

7. The three-dimensional, hollow structural member of claim 3 wherein the side panel includes an abutment spaced at a distance from the panel flange for slideable receipt of the free edge of the stiffener flange therebetween.

8. The three-dimensional, hollow structural member of claim 7 wherein the abutment of the side panel comprises a tube extending from the side panel beyond the inside face of the side panel.

9. The three-dimensional, hollow structural member of claim 3 wherein the panel flange includes a free edge; and wherein the removably securing means further comprises, in combination: lugs and latches extending from the free edge of the panel flange, with the lugs and latches of the end and side panels being in a slideable relation.

10. The three-dimensional, hollow structural member of claim 2 wherein the end panel includes a port extending through the inside and outside faces, with the end panel including a tube having a cross section corresponding to the shape of the port and extending from the end panel beyond the inside face, with the stiffener panel including an aperture for receipt of the tube.

11. The three-dimensional, hollow structural member of claim 10 wherein the tube is frusto-conical in shape and extends at an obtuse angle to the inside face of the end panel, with the stiffener panel being held with the end panel by removable nesting of the aperture on the tube.

12. Clamp for first and second structural members each having first and second faces, with the first faces of the first and second structural members having complementary shapes for abutting with each other, with each of the first and second structural members having at least first ports formed therein, with the first ports extending through the first and second faces of the first and second structural members and being of the same size, comprising, in combination: a primary band having a central wall having first and second edges; first and second outwardly directed side walls extending from the first and second edges of the central wall respectively, with the walls having a generally channel-shaped transverse cross section, with the walls being flexible between an insertion shape adapted to allow passage of the side walls through the ports and a connection shape adapted to allow positioning the central wall inside and abutting the port; and at least a first outwardly directed ear extending from the central wall intermediate the side walls and having a radial extent greater than the side walls and adapted to abut with the first faces of the structural members.

13. The clamp of claim 12 wherein the ear comprises, in combination: a planar member having a radially inner edge corresponding to and for abutment with the central wall and a radially outer edge; and at least first and second tabs extending from the radially inner edge generally perpendicular and in opposite directions to the planar member, with the tabs being secured to the central wall.

14. The clamp of claim 13 wherein the central wall includes a slot for slideably receiving the planar member, with the tabs located on the opposite side of the central wall than the radially outer edge.

15. The clamp of claim 14 wherein the central wall has a length, with the primary band being generally annular but U-shaped and having first and second free ends; and wherein the clamp further comprises, in combination: first and second secondary bands each having first and second ends; means for pivotally mounting the first ends of the first and second secondary bands together about a first axis; means for pivotally mounting the second end of the first secondary band relative to the first free end of the primary band; and means for pivotally mounting the second end of the second secondary band relative to the second free end of the primary band, with pivotal movement of the first and second secondary bands about the first axis causing the primary band to distort from its normal shape to further separate the first and second free ends of the primary band.

16. The clamp of claim 15 wherein the first and second walls of the primary band include flex notches to allow flexing of the walls of the primary band, with the flex notches dividing the primary band into first and second portions interconnected by the central wall acting as a hinge, with the first ear associated with the first portion; and wherein the clamp further comprises, in combination: a second ear associated with the second portion.

17. The clamp of claim 16 for the first and second structural members wherein the first ports have a generally cylindrical shape; wherein the flex notches further divide the primary band into a third portion interconnected by the central wall acting as a hinge, with the third portion located intermediate the first and second portions; and wherein the clamp further comprises, in combination: means formed in the primary band for preventing rotation of the first and second structural members relative to each other.

18. The clamp of claim 17 wherein the rotation preventing means comprises one of circumferentially spaced notches and detents formed in the third portion of the primary band adapted to slideably fit in the other of the circumferentially spaced notches and detents formed in the first and second structural members.

\* \* \* \* \*